Sept. 10, 1974  HIDEO FUJITA ET AL  3,835,006
METHOD OF REMOVING IONIC SUBSTANCES FROM A PULP
Filed July 10, 1972  3 Sheets-Sheet 1

3,835,006
METHOD OF REMOVING IONIC SUBSTANCES FROM A PULP
Hideo Fujita, Masami Ishitobi, and Hiroyoshi Suga, Amagasaki, and Fukuo Itohara, Michiharu Matsushita, and Hiroshi Yamamoto, Shizuoka, Japan, assignors to Dainichi-Nippon Cables, Ltd., Amagasaki-shi, Hyogo, and Tomoegawa Paper Manufacturing Co., Ltd., Tokyo, Japan
Filed July 10, 1972, Ser. No. 270,406
Claims priority, application Japan, July 10, 1971, 46/51,323; Apr. 19, 1972, 42/39,370
Int. Cl. B01d *13/02;* B01k *5/00*
U.S. Cl. 204—180 R                          27 Claims

ABSTRACT OF THE DISCLOSURE

A method of removing ionic substances from a pulp which is particularly useful in preparing an electrically insulating paper, which comprises continuously passing a pulp slurry comprising a dispersion of pulp in a liquid medium at a concentration of 0.05% to 6.0% by weight between oppositely charged facing electrodes to which an electric potential is applied to remove ionic substances remaining in the pulp, the pulp slurry having an electric conductivity of at least 10 $\mu\mho$./cm.

during passing between the electrodes.

BACKGROUND OF THE INVENTION

1. Field of the Invention

This invention relates to a method of removing ionic substances from a pulp which can be used in the production of electrically insulating paper having a superior dielectric dissipation factor. More specifically, the present invention relates to a method of treating pulp which comprises continuously passing a pulp slurry prepared by dispersing a pulp in a liquid medium between oppositely charged electrodes to which a voltage is applied to remove ionic substances remaining in the pulp.

2. Description of the Prior Art

The dielectric dissipation factor of an electrically insulating paper is greatly affected by metal ions remaining in the paper, and in order to obtain a paper of a low dielectric dissipation factor, it is necessary to remove these ions sufficiently.

Various attempts have been made to remove ionic substances remaining in paper or pulp sufficiently, but no sufficiently economical method has ever been presented. One of such attempts is a method wherein pulp or paper is washed with deionized water to dissolve and remove ions, but this method has the disadvantage that large amounts of deionized water and long periods of time are needed for the deionizing treatment. C. X. Kitaeba (*Bumaznaja Promyshlennost,* No. 6, pp. 4–7, 1957) attempted to remove ions in pulp by electrically dialyzing a pulp slurry comprising a dispersion of a pulp in distilled water in a concentration of 6.5% by weight while the slurry was maintained statically in an electric field. However, as admitted by the author, this method requires as long as several hours to from ten to twenty hours to accomplish sufficient deionization.

The inventors of the present invention previously developed a method of extracting and removing ions remaining in paper by the action of an electric field, which comprises flowing a liquid medium, obtained by dissolving ionic substances in deionized water to impart electric conductivity, between a pair of facing voltage-applied electrodes, feeding paper to be treated continuously into said flow and thus passing it between the pair of electrodes, thereby to remove the ionic substances. This new method basically differs from the electrodialysis of Kitaeba, *supra,* in that the paper is treated in an electric field in an electrically more conductive liquid medium, and makes it possible to treat paper within very short periods of time. However, this method requires drying by heat at the end of the treatment, and is therefore, uneconomical in that heat-drying must be carried out twice, first after the paper-making process and then after the treatment in an electric field.

It was noted that if the above method of treatment for paper can be applied to pulp, the heat-drying needs to be performed only once in the paper-making process. Thus, the inventors of the present application conducted experiments to apply this treating method to sheet-like and slurry-like pulps. Although the form of a material to be treated was the only difference, a number of new problems which were not at all anticipated from the experience in the treatment of paper arose in the treatment of sheet-like and slurry-like pulps. When a pulp sheet or a pulp slurry in a high concentration was treated, the rate of ion removal greatly differed between the side facing the anode and the side facing the cathode, with the rate of removal on the anode side being greater. Consequently, the removal of ionic substances was non-uniform in the direction of thickness. Also the temperature of pulp subjected to such treatment increased to 80 or 90° C., sometimes to nearly 100° C. This exothermic phenomenon itself is undesirable because of the ineffective consumption of electric power. Furthermore, where a high concentration of the pulp sheet or the pulp slurry is used sometimes air is included or occluded, and when the pulp is heated, air bubbles are formed in the pulp. The presence of the air bubbles results in a localized shielding of the electric field, and thus the air bubbles become an obstacle to the uniform removal of the ionic substances.

We have conducted extensive research work to overcome these new problems encountered in the extraction and removal of ions from the pulp using the action of an electric field, and this has led to the accomplishment of the present invention.

Summary of the Invention

The present invention provides a method of removing ionic substances from a pulp, which comprises continuously passing a pulp slurry prepared by dispersing a pulp in a liquid medium in a concentration of 0.05% to 6.0% by weight between oppositely charged electrodes to which a voltage is applied to remove ionic substances remaining in the pulp, the pulp slurry having a an electric conductivity of at least 10 $\mu\mho$./cm.

during the passing between the electrodes.

BRIEF DESCRIPTION OF THE ACCOMPANYING DRAWINGS

In FIGS. 1 to 3 and 5 to 7, the corresponding parts are indicated by the same numerals.

DETAILED DESCRIPTION OF THE INVENTION

As described above this invention comprises continuously passing a pulp slurry prepared by dispersing a pulp in a liquid medium having a specific concentration between a pair of facing voltage-applied electrodes to remove the ionic substances.

In a preferred embodiment, the pulp slurry is passed between a pair of facing voltage-applied electrodes with ion carrier layers interposed between each of the electrodes and the flow layer of pulp slurry. The term "ion carrier layers" is intended to cover a flowing liquid medium having an electric conductivity of at least $$10 \ \mu\mho./cm.$$

The pulps which can be treated by the method of this invention include all kinds of wood pulp obtained by dissociation in accordance with conventional methods, pulps which are obtained by beating these pulps or treating them otherwise, pulps prepared from synthetic polymers, or mixtures obtained by mixing the above-described pulps with materials such as mica, glass flakes or asbestos.

It is necessary that when a pulp slurry is passed between a pair of facing electrodes, the slurry should have an electric conductivity of at least $$10 \ \mu\mho./cm.$$

As will be described below, when the pulp slurry is passed through a central part between the electrodes and a liquid medium is caused to flow on both sides thereof, it is necessary that both the pulp slurry and the liquid medium on both sides thereof have an electric conductivity of at least $$10 \ \mu\mho./cm.$$

If the the electric conductivity is lower than $$10 \ \mu\mho./cm.,$$

long periods of time are required as in the prior art electrodialysis method described above, and the method is difficult to be performed on a commercial basis. In the treatment according to this invention, the effect of removing the ionic substances is greater the greater the electric conductivity of the pulp slurry being passed between the facing electrodes. On the other hand, when the electric conductivity of the pulp slurry becomes too high, electric power is wastefully consumed due to the electrolysis of the liquid medium. In addition, there is a danger of an explosion of hydrogen gas generated by electrolysis and an increase of Joule's heat loss occurs. Accordingly, it is preferred that the electric conductivity of the pulp slurry between the facing electrodes should be maintained at below $$5,000 \ \mu\mho./cm.$$

If suitable precautions are taken to remove the generated gas, the electric conductivity can exceed $$5,000 \ \mu\mho./cm.$$

An especially preferred electric conductivity of the pulp slurry is from $$50 \ \mu\mho./cm. \text{ to } 3,000 \ \mu\mho./cm.$$

The time required to reduce the ash content, i.e. reduce the content of ionic substances from the pulp prepared from the slurry so as to obtain a lower ash content, in accordance with the method of this invention differs and depends upon the electric conductivity of the pulp slurry, and the concentration of the pulp slurry and the rate of slurry feeding. It usually takes about 1 second to 10 minutes. Accordingly, the pulp slurry should be maintained at a conductivity of at least $$10 \ \mu\mho./cm.$$

for the time of passage between the facing electrodes. There is no need to have an electric conductivity of at least $$10 \ \mu\mho./cm.$$

over the entire period of passage between the facing electrodes, only that the electric conductivity at least be $$10 \ \mu\mho./cm.$$

while between the electrodes for the time periods described above.

The pulp is dispersed in an appropriate liquid medium in which an electrolyte can dissociate into ions to prepare a slurry, and then the pulp dispersion is fed between a pair of facing electrodes. A slurry can be alternatively prepared by adding previously loosened pulp into a liquid medium flowing between a pair of facing electrodes. When the pulp is dispersed in a liquid medium, a part of the ionic substances included in the pulp fibers may dissolve out into the liquid medium to increase the electric conductivity of the liquid medium beyond $$10 \ \mu\mho./cm.$$

The conductivity of the liquid medium, prior to the addition of pulp, may be at a level of less than $$10 \ \mu\mho./cm.$$

if the resultant pulp slurry has an electric conductivity of at least $$10 \ \mu\mho./cm.$$

The use of water as the liquid medium is most economical. Tap water, industrial water, distilled water and deionized water can be used. In order to increase the electric conductivity of the water employed, it is preferred to add an electrolyte which dissociates into ions in a liquid medium such as these types of waters, so long as the electrolyte added does not adversely affect the pulp. Almost any of the water-soluble metal salts and ammonium salts may be added. By adjusting the amount of the salt to be added, the desired electric conductivity of the water can be attained. The most preferred water soluble metal salts are the alkali metal salts such as the lithium, sodium and potassium salts, the alkaline earth metal salts such as the calcium, magnesium, barium and strontium salts, the ammonium salts of inorganic acids, carboxylic acids and amino acids, and the alkali metal phenolates. Examples of suitable inorganic acids are hydrochloric, sulfuric, nitric, nitrous, phosphoric, phosphorous, metaphosphoric, boric, and chloric. Examples of suitable organic acids are acetic, trichloroacetic, propionic, butyric, and salicylic as well as the phenols. Heavy metal salts of these organic acids and inorganic acids such as ferric chloride, ferrous chloride, zinc chloride, cobaltic chloride and nickel chloride are also suitable. In addition the water soluble salts, e.g., the alkali metal salts, of alkyl sulfates such as sodium methosulfate and potassium ethosulfate are suitable. Examples of amino acids are glutamic acid, glycine and tryptophane. Even these water-soluble inorganic acids, carboxylic acids, amino acids and phenols alone can also be employed as the above-described electrolyte so long as these acids do not adversely affect the pulp.

Water-soluble double salts of various metals such as KAl(SO$_4$)$_2$ and KMgClSO$_4$ are also included within the water-soluble salts that can be used in this invention.

As the liquid medium, a mixture of water with a water-soluble organic material can also be used. Examples of these water-soluble organic materials are monohydric, dihydric and polyhydric alcohols such as methyl alcohol, ethyl alcohol, propyl alcohol, isopropyl alcohol, ethylene glycol, propylene glycol or glycerol respectively, aldehydes such as formaldehyde, acetaldehyde and propionaldehyde, ketones such as acetone or methyl ethyl ketone, ketone alcohols such as acetol, ethers such as ethyl ether and methyl ethyl ether, esters of carboxylic acids such as ethyl acetate and ethyl formate, acid amides such as acetamide, and formamide, and dimethylsulfoxide. These organic materials cited above may be added to the aqueous solution of the various salts and acids described above.

The concentration of pulp in the pulp slurry can range from 0.05% to 6.0% by weight and in the present invention the pulp concentration is defined by the following equation:

$$\text{Pulp Concentration (percent)} = \frac{A}{B} \times 100$$

wherein A is the dry weight of the pulp (the degree of drying stipulated in JIS P 8127) in the pulp slurry of weight B. When the pulp concentration exceeds 6.0% by weight, the extent of the removal of ionic substances differs markedly between the anode side portion, the cathode side portion and the intermediate portion of the pulp slurry. Furthermore, the temperature of the pulp slurry is markedly elevated, and air bubbles are markedly generated in the mass of the pulp slurry to impede the removal of the ionic substances. That is to say, the same difficulties as in the treatment of the pulp sheet occur.

If the concentration of pulp is too low, the amount of pulp to be treated per unit time is decreased. Therefore, the pulp concentration should be at least 0.05% by weight. When the pulp concentration exceeds 5% by weight, it is better to supply the pulp slurry between the facing electrodes by forcing the slurry with a plunger pump or screw pump, etc. When the pulp concentration is not more than 5% by weight, the pulp slurry can be moved between the facing electrodes simply by the difference in hydrostatic pressure. If the pulp concentration of the slurry is within the above specified range, the pulp fibers in the slurry are mingled with one another while being moved between the facing electrodes, leading to uniform treatment. The preferred pulp slurry concentration is 0.05 to 5% by weight, an especially preferred concentration being 0.5 to 3% by weight.

In the present invention, it is essential that the pulp slurry should be passed "continuously" between a pair of facing electrodes from the standpoint of uniform treatment as well as the elimination of a localized increase in slurry temperature during the treatment. In general, air bubbles produce localized unextracted portions of the pulp slurry, leading to non-uniform treatment of the pulp slurry. Where the pulp slurry is passed through the treating chamber, the air bubbles are forced to move relatively to the surrounding pulp slurry. Such relative movement makes the treatment uniform. Any localized increases in slurry temperature are also effectively minimized by the movement of pulp slurry.

Figure 1:
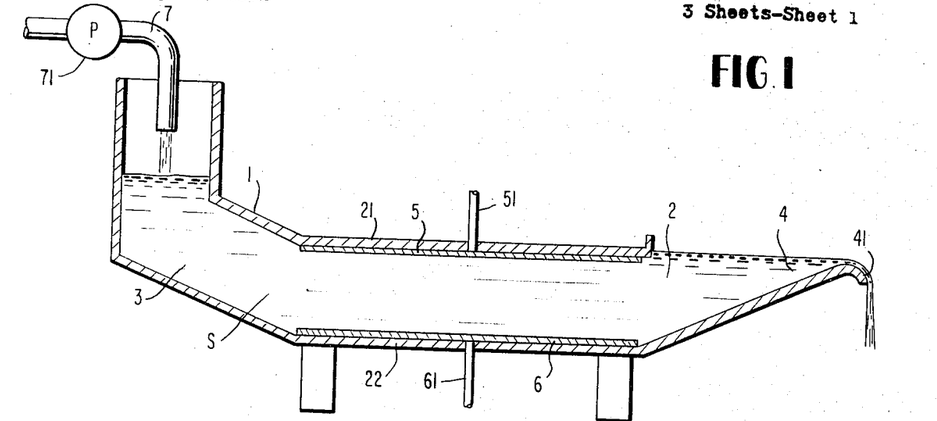
FIG. 1 is a longitudinal sectional view of a pulp treating apparatus containing a pair of facing electrodes, which illustrates the treating method in accordance with this invention.

The invention will now be described in greater detail with reference to the accompanying drawings. Referring to FIG. 1, a treating apparatus 1 comprises a treating chamber 2, a chamber 3 in front of said chamber 2, and a chamber 4 in the rear of said chamber 2. A flat anode 5 is provided on an upper wall 21 of the treating chamber 2, and a cathode 6 is provided on a bottom wall 22 in parallel with the anode 5. The anode 5 is connected to a lead wire 51 penetrating through the upper wall 21, and the cathode 6 is connected to a lead wire 61 penetrating through the bottom wall 22. A suitable material for the anode is, for example, platinum or carbon. Examples of a material for the cathode are platinum, carbon, mercury, aluminum, iron, gold, silver, nickel or lead. The length of the electrode is determined by considerations of the concentration of the pulp slurry, the rate of its feeding, the voltage applied, etc., and generally ranges from less than 1 m. to 10 m. or more. The facing electrodes may comprise several pairs of facing electrodes arranged in series in a spaced-apart relationship.

A pulp slurry tank (not shown) is provided for storing the pulp slurry. The slurry is continuously fed from a supply pipe 7 to the chamber 3 using a pump 71. The slurry S fed to the chamber 3 is passed to the chamber 4 through the treating chamber 2 by hydrostatic pressure due to the difference between the slurry level of the chambes 3 and 4. The desired hydrostatic pressure can be obtained by adjusting the rate of feeding the slurry by the pump 71. While the pulp slurry is passed through the space between the anode 5 and the cathode 6 to which voltage has been applied, ionic substances remained in the fibers composing the pulp slurry are extracted in the form of ions into the liquid medium surrounding the fibers. The rate of passing the pulp slurry in the chamber 2 is determined by such parameters as the type of the starting plup, the electric conductivity of the pulp slurry, the concentration of the pulp slurry, the distance between the electrodes, the lengths of the electrodes or the voltage applied. But, the rate of movement is set so that the time during which the pulp slurry is passed between the facing electrodes (the extraction time) is at least from 1 second to 10 minutes.

The preferable voltage to be applied is direct current voltage, and alternating voltage whose half cycle is equal to or longer that the time taken for the ionic substances in the fiber to be extracted into liquid medium, may also be used. Such alternating voltage may also be superposed on the direct current voltage. The effect of the removal of ionic substances increases with an increase in the voltage applied. Usually, it is more advisable to apply a voltage of 20 v. to 500 v. per centimeter of the distance between the facing electrodes.

The electric conductivity of the pulp slurry to be treated can be monitored by a conductivity measuring electrode at a desired position between the facing electrodes to control continuously the electric conductivity of the slurry between the electrodes at the required level. If the electric conductivity is below the lower limit of the range specified in this invention, a liquid medium with a high electric conductivity is added. Whereas if it exceeds the upper limit, a liquid medium with a low conductivity is added.

In the apparatus shown in FIG. 1, the pulp fibers which have been passed through the chamber 2 tend to be recontaminated during its residence in the chamber 4 by the surrounding medium containing ions, i.e., those originally contained in the liquid medium and those extracted from the fibers composing the slurry. If the time of residence in the chamber 4 is not long, no marked recontamination will take place, as will be understood from Example 1 to be described later on.

The pulp slurry which has been passed through the treating chamber 2 and subsequently reached the chamber 4 immediately overflows from an exit 41 of the chamber 4, and is separated into the pulp and the liquid medium by a water-freeing press (not shown). If desired, the separated pulp fibers are washed with deionized water. Recontamination may also be prevented by permitting the pulp slurry treated to overflow into a washing tank filled with deionized water.

Studies of the present inventors show that ions extracted from the pulp fibers or those originally contained in the liquid medium, such as metallic ions, sulfate ions, and chlorine ions, are attracted towards the anode or cathode in the treating chamber, and at the exit of the treating chamber, the concentration of such metallic ions becomes higher in the vicinity of the cathode, while the concentration of the sulfate ions, or chlorine ions, etc. becomes higher near the anode. It has also been found that at the central portion between the electrodes, the concentration of these ions becomes lower. Therefore, if the pulp slurry treated is separated at the exit of the facing electrodes into a layer near the anode, a layer near the cathode, and an intermediate layer using a suitable partition plate, and those layers are separately removed, the risk of recontamination of the pulp removed from the intermediate layer is reduced, because the concentration of these ions in the pulp removed from the intermediate layer is low. If the pulp slurry is passed through a central portion between the facing electrodes with the interposition of liquid medium layers between the moving slurry layer and the electrodes, the above-described ions are concentrated in the liquid medium layers near the exit of the treating chamber. Since the concentration of these ions in the pulp slurry is low, the risk of recontamination of the treated pulp slurry is reduced. In the present specification, the layers of the liquid medium to be interposed between each of the electrodes and the pulp slurry layer are called "ion carrier layers." These ion carrier layers may be either flowing or static. It is desirable, however, that the ion-carrier layer flows, since it renders the electric conductivity distribution of the ion carrier layer uniform. The ion carrier layer, as in the case of the pulp slurry, should have an electric conductivity of at least $$10 \text{ m}\mho./\text{cm.},$$

preferably at least $$50 \ \mu\mho./\text{cm}.$$

The same kind of liquid medium above described can be employed as the ion carrier layer medium.

The liquid medium in ion carrier layers need not necessarily have an electrical conductivity of at least $$10 \ \mu\mho./\text{cm}.$$

over the entire length along the electrodes, provided the liquid medium in the ion carrier layers has an electric conductivity of at least $$10 \ \mu\mho./\text{cm}.$$

in the region where the pulp slurry has an electrical conductivity of at least $$10 \ \mu\mho./\text{cm}.$$

Figure 2:
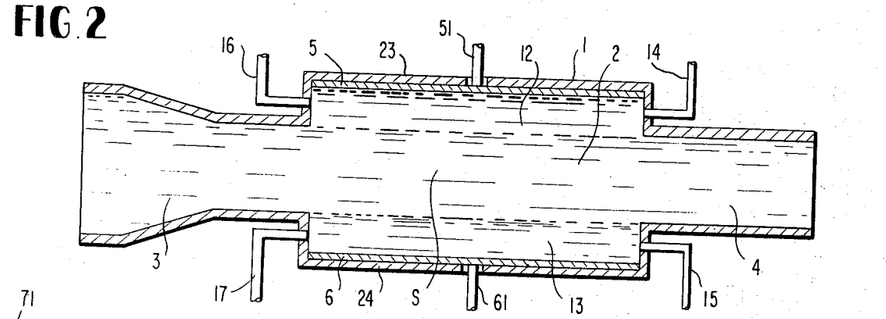
FIG. 2 is a top plane of another treating apparatus for illustrating the treating method.

Both the above-described ion carrier layers are formed using suitable methods. In the treating apparatus shown in FIG. 2, anode 5 and cathode 6 are provided on both side walls 23 and 24 of the apparatus. A liquid medium is supplied to the chamber 2 from pipes 16 and 17 and then discharged from pipes 14 and 15, so that it could flow along both surfaces of the electrodes, whereby ion carrier layers 12 and 13 are formed. Pulp slurry S fed from chamber 3 is passed through the interspace between the ion carrier layers 12 and 13, and reaches the chamber 4.

Figure 3:
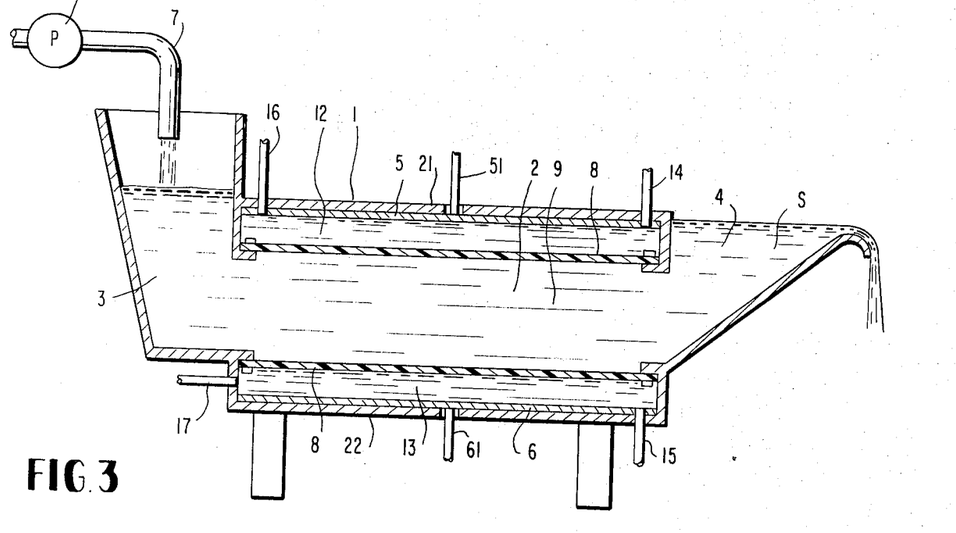
FIG. 3 is a longitudinal sectional view of the treating apparatus which includes diaphragms.

In the apparatus shown in FIG. 3, the chamber 2 provides a diaphragm 8 by which ion carrier layers 12 and 13 are isolated from the pulp slurry passageway 9. A liquid medium is introduced from pipes 16 and 17 and discharged from pipes 14 and 15, and vice-versa. The pipes 14 and 16 are extended through the upper wall and pipes 15 and 17 through the bottom wall. Preferable diaphragms are, for example, woven, non-woven fabrics and papers which are composed of natural and/or synthetic polymer fibers such as polyethylene, polypropylene, palyamide, polyester or cellulose, in addition to sintered glass plates, and open cellular plastic foamed sheets. Preferably, these diaphragms have the desired mechanical strength when immersed in the liquid and if desired, they may be reinforced with a suitable supporting member. Unglazed plates and semi-permeable membranes such as bladders, cellophanes, etc. which are conventionally used in electrodialysis, are of no use as the diaphragm in this invention.

The pulp slurry is passed through the pulp slurry passageway 9 from the chamber 3, and reaches the chamber 4, and during the passage through the passageway 9, undergoes the extraction treatment in the electric field.

The distance between diaphragm 8 and each of the electrodes is 0.5 to 50 cm., preferably 1 to 30 cm. The treatment method where the pulp slurry passageway is isolated from the ion carrier layer using diaphragms is most recommended from a practical standpoint and to prevent recontamination of the resultant pulp with ionic substances.

Preferable diaphragms have a drainage time, as measured by JIS P 3801 (1956) Item 7.5, of at least 100 seconds, and, when impregnated with a liquid having an electric conductivity of at least $$100 \ \mu\mho./\text{cm}.$$

have an electric conductivity of at least $\frac{1}{1000}$ of the electric conductivity of the liquid itself.

Figure 5:
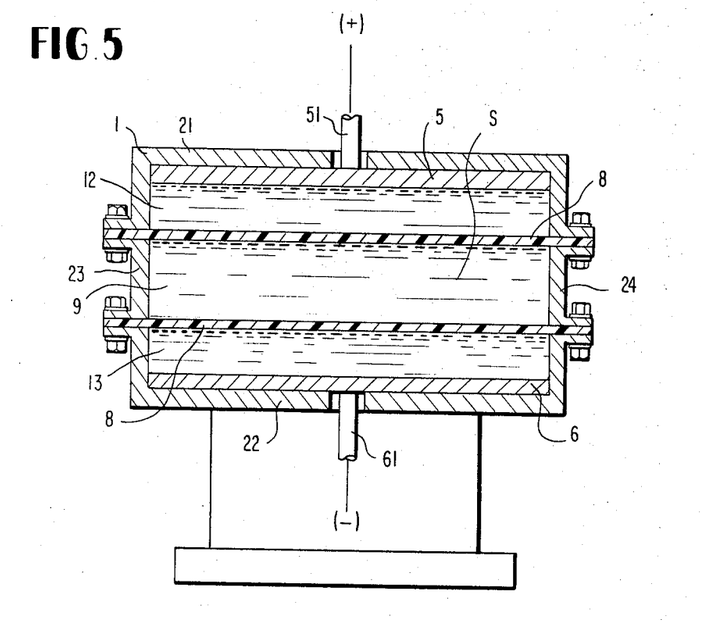
FIGS. 5 to 7 are transverse sectional views of various treating chambers with diaphragms.
Figure 6:
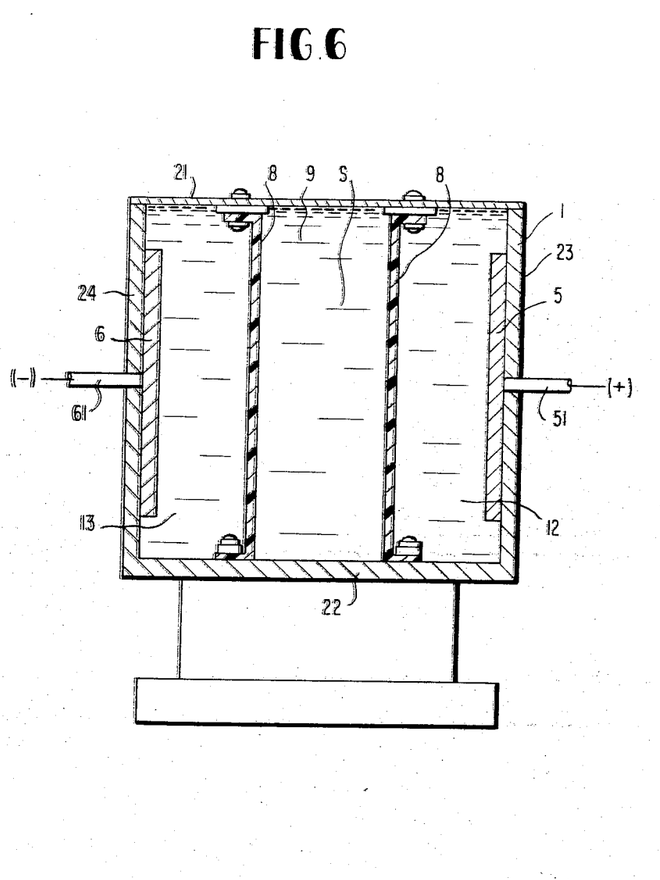
Figure 7:
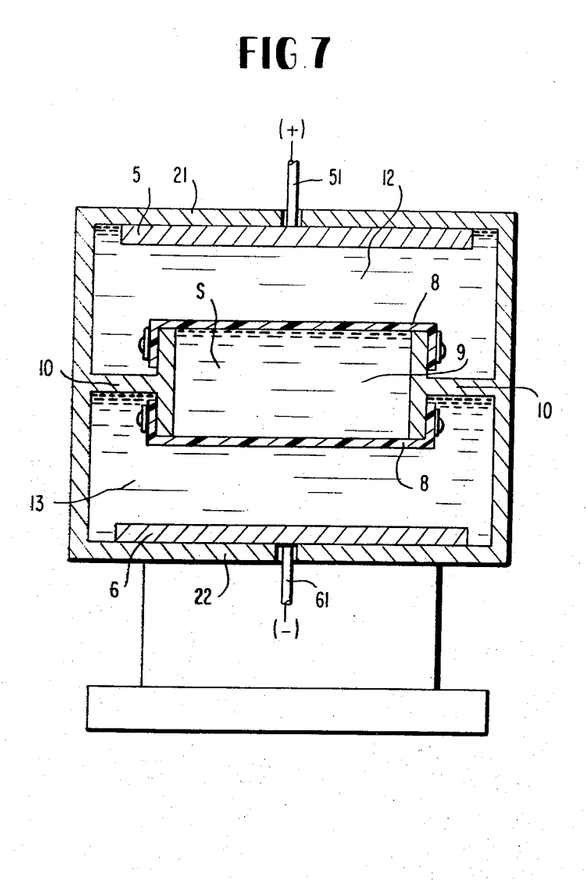

Various types of cross sectional arrangements of chamber 2 equipped with diaphragm 8 are shown in FIGS. 5 to 7. The reference numeral 10 represents an electrical insulating plate provided, to prevent the extra current flowing outside passageway 9, whereby the effective current is concentrated in the region of passageway. The effective removal of ionic substances is not accomplished in the pulp fiber unless the electric current flows through the pulp slurry passageway.

The invention will be described in greater detail by reference to the following Examples together with Comparative Examples. All parts and percents are by weight unless otherwise indicated.

In the following Examples and Comparative Examples, two pulp sheets A and B were used, of which the size and the ash content are shown in Table 1.

TABLE 1

|  | Pulp sheet A | Pulp sheet B |
|---|---|---|
| Thickness (cm.) | 3 | 3 |
| Width (cm.) | 45 | 29 |
| Ash content (wt. percent)* | 0.23 | 0.40 |

* Measured in accordance with JIS C-2111-9.

Figure 4:
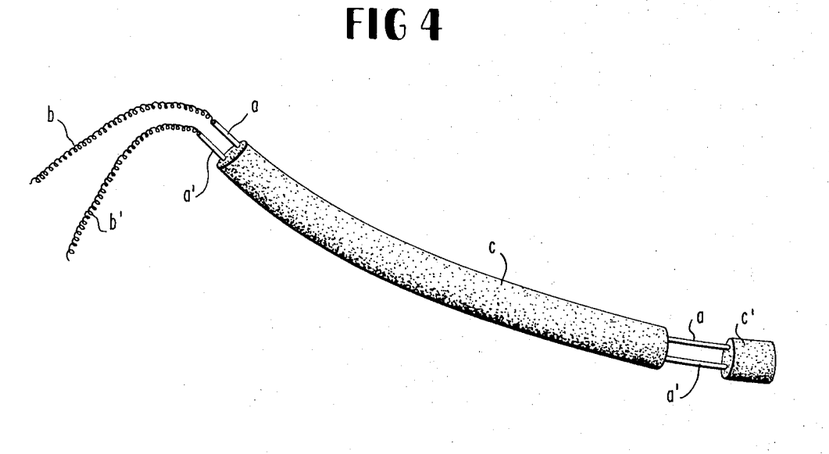
FIG. 4 is a sectional view of an electrode for measuring the electric conductivity of a pulp slurry or a liquid medium.

In the following Examples and Comparative Examples, the electric conductivities of deionized water, pulp slurry and the liquid medium in the ion carrier layers were measured using a conductivity measuring electrode. This electrode is composed of a pair of platinum wires ($a$ and $a'$) with a diameter of 1 mm., which are separated at a distance of 2 mm. by insulating resin ($c$ and $c'$), its probe being 3 cm. in length.

This electrode is set in a given position to be measured, and lead wires $b$ and $b'$ are connected to a Wheatstone bridge having an input source of a frequency of 1 KHz., so as to measure the corresponding alternating current conductivity. Its electrode constant was determined utilizing a liquid having a known electric conductivity.

Comparative Example 1

Pulp sheet B was dispersed in deionized water having an electric conductivity of 0.1 $\mu\mho./\text{cm}.$, to prepare pulp slurries with a concentration of 0.1% and 3% respectively. Each of the slurries prepared was thoroughly stirred for on hour at room temperature, and then pressed to remove water. After the exclusion of water, the resultant pulp sheet contained water in a content of 90%. This pulp containing water was again dispersed in deionized water, and this washing cycle was repeated. The ash content in the resultant pulp was determined as a function of the washing cycle with the results obtained being given in Table 2.

TABLE 2

| Cycle of washings | Ash content (wt. percent) | | | | |
|---|---|---|---|---|---|
| | 1 | 2 | 3 | 4 | 8 |
| Dispersion concentration: | | | | | |
| 0.1% | 0.35 | 0.30 | 0.29 | 0.28 | 0.27 |
| 3% | 0.37 | 0.34 | 0.33 | 0.32 | 0.30 |

A few washing cycles are fairly advantageous for reducing the ash content of the resultant pulp, but additional washing cycles do not prove to be advantageous.

Comparative Example 2

The treatment was performed using the apparatus of the same construction as shown in FIG. 1, which was provided with a treating chamber 1 m. in length, 30 cm. in width and 5 cm. in height. In the chamber 2, a platinum anode plate was attached to the inner side of the upper wall and was connected to a lead wire penetrating through the upper wall while a platinum cathode plate was attached to the inner surface of the bottom wall and connected to a lead wire penetrating through the bottom wall.

Pulp sheet A was dispersed in deionized water having an electric conductivity of $$0.1 \ \mu\mho./cm.$$

to prepare a slurry having a pulp concentration of 0.7%. The slurry prepared had an electric conductivity of $$6.0 \ \mu\mho./cm.$$

The pulp slurry was fed continuously into the treating chamber at a flow rate of 7.5 liters/min., and in the meantime, a direct current voltage of 1,000 v. was applied between a pair of facing electrodes. It took 120 seconds for the pulp slurry to pass through the treating chamber. The pulp slurry under treatment had an electric conductivity of $$6.4 \ \mu\mho./cm.,$$

the measuring position being centrally located between the facing electrodes, which were 50 cm. apart from the inlet of the facing electrodes (in the following Comparative Examples and Examples, the electric conductivity of the pulp slurry being treated was measured at the same place). Within ten seconds, the pulp slurry overflowed from the chamber 4 onto a mat. The pulp deposited on the mat (pulp concentration of approximately 10%) was then washed thoroughly by dispersion in deionized water (electronic conductivity 0.1 $\mu\mho./cm.$)

in an amount of 10 cc. per gram of the water-freed corresponding dried pulp. The pulp thus washed had an ash content of 0.22%, which was only slightly lower than that of pulp sheet A.

Comparative Example 3

The apparatus employed in Comparative Example 2 was partially modified so that a nylon net could be moved at a parallel level at a height of 1 cm. apart from the surface of the cathode. An aqueous solution of CaCl$_2$ having an electric conductivity of $$50 \ \mu\mho./cm.$$

was continuously fed from the exit of the treating chamber and discharged from the opposite side.

The nylon net mounting pulp sheet B was continuously moved at a rate of 0.5 m./min. past the facing electrodes and a direct current voltage of 1,000 v. was applied between the facing electrodes. The passage time of pulp B was 120 sec. After being passed through the treating chamber, the pulp sheet was immediately washed thoroughly with deionized water. The pulp sheet thus treated was divided into two layers to determine their ash contents separately; one of which had faced the anode and the other of which had faced the cathode. It was found that the anode side layer had an ash content of 0.10% showing sufficient treatment, wereas the cathode side had an ash content of 0.25% suggesting insufficient treatment. A thermistor thermometer was inserted in the pulp sheet immediately after the pulp sheet had passed through the treating chamber to estimate the temperature rise of the pulp sheet treated. The pulp sheet was found to have a temperature of 85° C. (before the treatment: 25° C.).

Comparative Example 4

A given amount of a pulp slurry was treated without any movement using an apparatus of the type shown in FIG. 3.

The treating chamber 2 was 1 m. long, 30 cm. wide and 5.5 cm. high. A platinium plate serving as an anode 5 was attached to the inner surface of the upper wall, and mercury serving as a cathode 6 was settled on the bottom wall in a depth of 0.5 cm. (the distance between the electrodes was 5 cm.). This chamber 2 was equipped with the passageway 9 which was consrtucted in the form of a rectangular tube with a membrane made of cellophane, 0.1 mm. thick, being separated 0.5 cm. apart from both surfaces of electrodes. Here cellophane as a membrane has a drainage time of above $10^5$ sec. and specific conductivity index of $3 \times 10^{-4}$, as determined according to the methods described in Table 7. The passageway 9 was communicated with the chamber 3 and the chamber 4 at both ends.

Pulp sheet B was dispersed in deionized water to prepare a pulp slurry having a pulp concentration of 6.5%, and the resultant slurry was charged into the pasageway 9. Deionized water (electric conductivity 0.1 $\mu\mho./cm.$)

was introduced at a flow rate of 2 liters/hr. from inlets 14 and 15 into a space 13 between the diaphragm 8 and the mercury electrode 6 and a space 12 between the diaphragm 8 and the platinum electrode 5, and discharged from outlets 16 and 17 respectively. A direct current voltage of 400 v. was applied between the platinum anode 5 and the mercury cathode 6. The pulp treated was then washed with deionized water in the same manner as described in Comparative Example 2, and the ash content of the resultant pulp was measured. This experiment was repeatedly conducted for varying periods of the voltage application on the virgin pulp slurry. The results obtained are given in Table 3.

Table 3

| Time of Applying Voltage (minutes): | Ash Content Percent |
|---|---|
| 5 | 0.36 |
| 10 | 0.34 |
| 20 | 0.31 |
| 30 | 0.29 |
| 60 | 0.26 |

Example 1

As a liquid medium, an aqueous solution of CaCl$_2$ was prepared by dissolving a chemical grade of CaCl$_2$ in deionized water, its electric conductivity being $$50 \ \mu\mho./cm.$$

The pulp sheet A was dispersed in this aqueous solution, as the liquid medium, in a pulp concentration of 0.7%. The same treatment as described in Comparative Example 2 was conducted except that the electric conductivity of the slurry was $$18 \ \mu\mho./cm.,$$

where a stationary treatment was employed. The pulp slurry subjected to treatment was divided into two layers, an upper one and a lower one, using a partition plate which was provided at the exit of the treating chamber. After the stationary treatment was started, a portion of the pulp slurry treated was separately withdrawn from both layers at periods of time of 10, 30 and 60 minutes. In the present Example, each specimen of pulp slurry was left to stand for 10 seconds after withdrawal (only that from the cathode side was additionally left to stand for 5 minutes), and then subjected to water freeing and water washing using the same procedures as described in Comparative Example 2. The ash content of the resultant pulp was measured, and the results obtained are summarized in Table 4.

TABLE 4

| Standing period prior to water washing | Ash content (percent) | | |
|---|---|---|---|
| | Upper layer (anode side) | Lower layer (cathode side) | |
| | 10 sec. | 10 sec. | 5 min. |
| Time at which specimen was withdrawn: | | | |
| 10 minutes | 0.12 | 0.13 | 0.18 |
| 30 minutes | 0.13 | 0.14 | 0.19 |
| 1 hour | 0.12 | 0.14 | 0.18 |

Although hardly any extraction took place in Comparative Example 2, the ash content of the pulp treated for as short as 120 seconds in this Example was reduced to a level of from 0.12% to 0.19%. Even though the pulp was washed with water after standing for 5 minutes, the ash content of the pulp was reduced as low as 0.18%.

A slight recontamination of the resultant pulp slurry was observed, as compared with a run in which the pulp slurry treated was left to stand for 10 seconds.

It is evident that the resultant pulp slurried withdrawn from both layers have the same orders of ash content, as compared with the remarkable difference in ash content between the corresponding layers of a pulp sheet treated in Comparative Example 3.

Slurry temperature during stationary treatment was within 33° C., indicating that there was hardly any appreciable temperature rise.

Examples 2 to 7

Using the same apparatus as described in Example 1, pulp sheet B was treated using the same procedures as described in Example 1 except that the type of a liquid medium for slurrying the pulp sheet B, the concentration of the pulp slurry, the rate of feeding the pulp slurry between the facing electrodes, and the voltage applied were varied as indicated in Table 5. After the treatment, the pulp slurry was washed with water as in Example 1 without a separation into two layers. Through this series of runs, the pulp slurry treated was water-washed within 1 to 2 minutes. The electric conductivity of the pulp slurry before and during the treatment, the current flowing between the electrodes during the treatment, and the residual ash content of the pulp were determined, and the results obtained are summarized in Table 5.

Examples 8 to 27

In all runs of these Examples, the same apparatus as described in Comparative Example 4 was employed except that a diaphragm of an aromatic polyamide paper (Nomex, trade name of the product of Du Pont) was substituted in place of the cellophane.

Pulp slurrier of various concentrations were prepared from pulp sheet B. Each pulp slurry was fed continuously into passageway 9 separated with diaphragm 8, and treated under the conditions indicated in Table 6.

The direct current voltage indicated in Table 6 was applied between the anode 5 and the cathode 6 in FIG. 3, and the current cited in Table 6 implied the current in a stationary state of the pulp treatment. The electric conductivity of both the ion carrier layers was measured at the specified position which was quite close to the diaphragm 8 and was 50 cm. apart from the inlet of the facing electrodes. In each Example, the flowing direction of the liquid medium in the ion carrier layer was the same at both sides. When the flowing direction of the liquid medium in both carrier layers was the same as that of the pulp slurry, the direction in Table 6 was designated "same" and, if reverse "opposite."

The pulp slurry treated was washed with water in the same manner as described in Comparative Example 2. The results are summarized in Table 6.

In addition, in the cases of Examples 9, 13, 18, 24 and 26 a 100μ thick paper was made of the corresponding resultant pulp using a hand sheet machine with ionized water. The apparent density of the paper obtained and its dielectric dissipation factor in an oil-impregnated state are also shown in Table 6.

A 100μ thick paper formed from original pulp sheet B using the same hand sheet machine had an apparent density of 0.49 g./cm.$^3$, and a dielectric dissipation factor, in an oil-impregnated state, of 0.16% at 100° C.

The dielectric dissipation factor of the oil-impregnated paper was measured by inserting three sheets of the paper into a flat circular electrode at a temperature of 100° C. and a field strength of 10 kv./mm. generated by a high voltage Schering bridge. The paper to be measured was previously dried at 120° C. for 4 hours in vacuo at 1/1000 mm. Hg, and impregnated with a degassed cleaned dodecylbenzene oil.

It is obvious from the results shown in Table 6 that the treatment according to the method of Examples 8 to 27 could achieve sufficient removal of ionic substances within very short periods of time, as compared with the case in which no diaphragm was involved (for example, compare Example 2 with Example 8, and Example 3 with Example 10).

Regarding the production of pulp in use for the paper displaying a low dielectric dissipation factor, the excellent advantages of this invention are clearly shown in Table 6.

In Example 27, where the pulp slurry concentration was as high as 6%, a little difficulty arose in keeping the pulp slurry flowing constantly and the occurrence of small air bubbles was observed in the pulp slurry.

| Example number | Pulp slurry conc., percent | Liquid medium for slurrying pulp | | Average treating time* (sec.) | Voltage applied (v.) | Current (A.) | Electric conductivity of slurry, (μω/cm.) | | Ash content of the treated pulp, percent |
|---|---|---|---|---|---|---|---|---|---|
| | | Medium | Electric conductivity (μω./cm.) | | | | Before treatment | During treatment | |
| 2 | 0.1 | Deionized water | 2 | 60 | 400 | 23 | 11 | 20 | 0.20 |
| 3 | 0.5 | CaCl$_2$ aq. sol | 110 | 30 | 400 | 83 | 104 | 330 | 0.15 |
| 4 | 1 | CaCl$_2$ aq. sol | 110 | 30 | 400 | 96 | 101 | 470 | 0.18 |
| 5 | 2 | MgSO$_4$ aq. sol | 200 | 20 | 400 | 140 | 180 | 690 | 0.19 |
| 6 | 3 | Deionized water | 2 | 120 | 400 | 32 | 14 | 130 | 0.24 |
| 7 | 5 | CaCl$_2$ aq. sol | 370 | 120 | 400 | 190 | 340 | 970 | 0.17 |

*Calculated from the rate of feeding the pulp slurry (liters/min.) (this basis will apply to the following table.

| Example number | Concentration of pulp slurry supplied | Liquid medium used for slurrying pulp | Liquid medium electric conductivity ($\mu\omega$/cm.) | Treating time sec.) | Voltage applied (v.) | Current (a.) | Electric conductivity of the pulp slurry, $\mu\omega$/cm.) | |
|---|---|---|---|---|---|---|---|---|
| | | | | | | | Before treatment | During treatment |
| 8 | 0.1 | Deionized water | 2 | 60 | 400 | 22 | 11 | 35 |
| 9 | 0.1 | do | 2 | 60 | 400 | 21 | 11 | 34 |
| 10 | 0.5 | CaCl$_2$ aq. sol | 110 | 30 | 400 | 81 | 104 | 320 |
| 11 | 0.5 | CaCl$_2$ aq. sol | 110 | 30 | 400 | 82 | 104 | 325 |
| 12 | 0.5 | CaCl$_2$ aq. sol | 110 | 20 | 400 | 66 | 104 | 200 |
| 13 | 0.5 | CaCl$_2$ aq. sol | 110 | 5 | 400 | 63 | 104 | 180 |
| 14 | 0.5 | Deionized water | 2 | 60 | 200 | 9 | 11 | 20 |
| 15 | 0.5 | CaCl$_2$ aq. sol | 54 | 5 | 200 | 30 | 50 | 130 |
| 16 | 0.5 | NaCl aq. sol | 268 | 30 | 400 | 76 | 260 | 740 |
| 17 | 0.5 | HCl aq. sol | 256 | 5 | 400 | 85 | 250 | 320 |
| 18 | 2.0 | Deionized water | 2 | 60 | 400 | 93 | 11 | 360 |
| 19 | 2.0 | do | 2 | 60 | 400 | 92 | 11 | 360 |
| 20 | 2.0 | Ethylene-diamine | 183 | 30 | 400 | 110 | 180 | 600 |
| 21 | 2.0 | NH$_4$NO$_3$ aq. sol | 85 | 20 | 400 | 115 | 180 | 520 |
| 22 | 2.0 | NH$_4$NO$_3$ aq. sol | 85 | 5 | 400 | 106 | 180 | 480 |
| 23 | 2.0 | MgSO$_4$ aq. sol | 185 | 20 | 400 | 128 | 180 | 620 |
| 24 | 2.0 | MgSO$_4$ aq. sol | 185 | 20 | 400 | 140 | 340 | 1,020 |
| 25 | 5.0 | Deionized water | 2 | 120 | 400 | 180 | 12 | 1,080 |
| 26 | 5.0 | Mg(NO$_3$)$_2$ aq. sol | 351 | 120 | 400 | 175 | 340 | 1,060 |
| 27 | 6.0 | MgSO$_4$ aq. sol | 380 | 120 | 400 | 190 | 360 | 1,200 |

| | Electric conductivities of the liquid media constituting the ion carrier layer | | | | | | | Properties of the paper made of pulp treated | | |
|---|---|---|---|---|---|---|---|---|---|---|
| | Liquid medium constituting the ion carrier layer on the cathode side | | Liquid medium constituting the ion carrier layer on the anode side | | | Rate of charge and discharge of the liquid medium constituting the ion carrier liquid | | Ash content of pulp treated, percent | Apparent density (g./cm.$^3$) | Dielectric dissipation factor in oil impregnated state, 100° C., percent |
| | | Electric conductivity, ($\mu$ $\epsilon$/cm.) | | Electric conductivity, ($\mu$ $\epsilon$/cm.) | | | | | | |
| Example number | Nature of liquid medium | Before treatment | During treatment | Nature of liquid medium | Before treatment | During treatment | Rate liter/min.) | Direction of flow | | | |
| 8 | CaCl$_2$ aq. sol | 1,900 | 2,060 | Deionized water | 2 | 114 | 1 | Same | 0.15 | | |
| 9 | CaCl$_2$ aq. sol | 1,900 | 2,050 | do | 2 | 110 | 1 | Opposite | 0.15 | 0.48 | 0.11 |
| 10 | CaCl$_2$ aq. sol | 430 | 1,080 | do | 2 | 660 | 3 | Same | 0.08 | | |
| 11 | MgCl$_2$ aq. scl | 430 | 1,010 | do | 2 | 670 | 3 | Opposite | 0.07 | | |
| 12 | NaCl aq. sol | 430 | 920 | do | 2 | 480 | 3 | do | 0.10 | | |
| 13 | BaCl$_2$ aq. sol | 430 | 810 | do | 2 | 380 | 3 | do | 0.20 | | |
| 14 | Mg(NO$_3$)$_2$ aq. sol | 1,900 | 1,920 | do | 2 | 70 | 1 | do | 0.18 | 0.50 | 0.12 |
| 15 | Na$_2$SO$_4$ aq. sol | 430 | 750 | do | 2 | 330 | 3 | do | 0.24 | | |
| 16 | Na$_2$SO$_4$ aq. sol | 460 | 1,400 | do | 2 | 1,110 | 3 | do | 0.09 | | |
| 17 | Na$_2$SO$_4$ aq. sol | 460 | 590 | do | 2 | 180 | 1 | do | 0.18 | | |
| 18 | NaCl aq. sol | 490 | 860 | NH$_4$Cl aq. sol | 520 | 870 | 3 | Same | 0.10 | 0.51 | 0.11 |
| 19 | NaCl aq. sol | 490 | 870 | HCl aq. sol | 520 | 810 | 3 | Opposite | 0.10 | | |
| 20 | CaCl$_2$ aq. sol | 310 | 820 | Deionized water | 2 | 420 | 4 | do | 0.14 | | |
| 21 | CaCl$_2$ aq. sol | 310 | 800 | do | 2 | 405 | 4 | do | 0.19 | | |
| 22 | CaCl$_2$ aq. sol | 310 | 710 | do | 2 | 386 | 4 | do | 0.25 | | |
| 23 | MgSO$_4$ aq. sol | 210 | 1,260 | do | 2 | 1,030 | 2 | do | 0.16 | | |
| 24 | MgSO$_4$ aq. sol | 210 | 1,320 | do | 2 | 1,150 | 2 | do | 0.12 | 0.53 | 0.10 |
| 25 | ZnCl$_2$ aq. sol | 480 | 2,100 | HCl aq. sol | 420 | 2,100 | 4 | do | 0.12 | | |
| 26 | ZnCl$_2$ aq. sol | 480 | 2,400 | 1:1 mixed aq. sol. of HCl and CaCl$_2$ | 230 | 1,800 | 4 | do | 0.13 | 0.51 | 0.10 |
| 27 | ZnCl$_2$ aq. sol | 480 | 2,500 | HCl aq. sol | 450 | 2,400 | 4 | do | 0.18 | | |

COMPARATIVE EXAMPLE 5

The same apparatus (FIG. 3) as used in Example 8 to 27 was used. The slurry to be supplied had poor flowability because of a pulp concentration of 7%. The treating conditions were the same as those used in Example 25 except that a pulp slurry in a concentration of 7% was fed into the passageway using a pump. The electric current fluctuated in the range of 90 a. and 130 a. during the treatment. The pump was locally heated, and the consequent formation of air bubbles was observed. These air bubbles disturbed the current flow, leading to a non-uniform treatment. The pulp slurry treated was separately withdrawn in upper and lower two layers through the insertion of a partition plate and followed by the same water washing as was used in Comparative Example 2. The pulp withdrawn from the upper layer had an ash content of 0.13 to 0.20%, and the pulp withdrawn from the lower layer had an ash content of 0.30% and 0.39%, suggesting a non-uniform treatment.

EXAMPLES 28 TO 36

In this series of Examples 28 to 36, the same apparatus as was used in Examples 8 to 27 was employed, except that the diaphragm separating the passageway for the pulp slurry was replaced with the materials indicated in Table 7.

In Examples 28 to 36, pulp sheet B was dispersed in an aqueous solution of calcium chloride having an electric conductivity (20° C.) of 100 $\mu\mho$./cm.

in a pulp concentration of 0.5% by weight to prepare a pulp slurry. The pulp slurry was passed continuously through the pulp slurry passageway at a rate of 36 liters/min. In these runs, a diluted aqueous solution of sulfuric acid was fed at a rate of 2 liters/min. into an ion carrier layer located to the side of the anode, its electric conductivity being 212 $\mu\mho$./cm.

On the other hand, an aqueous solution of CaCl$_2$ (electric conductivity of 300 $\mu\mho$./cm.)

in the case of Examples 28, 30 and 34, of MgCl$_2$ (250 $\mu\mho$./cm.)

in the case of Examples 29 and 31 and of NH$_4$NO$_3$ (280 $\mu\mho$./cm.)

in the case of Examples 32, 33 and 35 were respectively fed at a rate of 3 liters/min. into an ion carrier layer located to the side of the cathode. A direct current voltage of 500 v. was applied between the facing electrodes in these runs.

TABLE 7

| Example number | Material | Thickness (mm.) | Drainage time [1] | Specific conductivity index [2] | Ash content of the pulp treated, percent |
|---|---|---|---|---|---|
| 28 | Glass cloth | 1 | 6 | 0.81 | 0.18 |
| 29 | Polyester nonwoven fabric sandwiched with glass cloth.[3] | 1.25 | 10 | 0.80 | 0.17 |
| 30 | Polypropylene fiber paper sandwiched with glass cloth. | 1.25 | 90,000 | 0.0005 | 0.16 |
| 31 | ...do... | 1.20 | 300 | 0.010 | 0.12 |
| 32 | Polyethylene fiber paper sandwiched with glass cloth. | 1.25 | 400 | 0.16 | 0.11 |
| 33 | ...do... | 1.25 | 700 | 0.15 | 0.10 |
| 34 | Polyester nonwoven fabric sandwiched with glass cloth. | 1.15 | 1,000 | 0.05 | 0.09 |
| 35 | ...do... | 1.15 | 20,000 | 0.015 | 0.10 |

[1] Determined in accordance with JIS P 3801 (1956) Item 7.5.
[2] In each example, each diaphragm material was impregnated with the liquid which was fed into the ion carrier layer on the cathode side and then the liquid-impregnated diaphragm was held between flat electrodes using guard ring as shown in Figure 7 of ASTM, A-150-68 and the alternating current conductivity was determined using a Wheatstone bridge. The alternating current conductivity was measured at 20° C. at a frequency of 1 kHz. The value thus obtained was divided by the electric conductivity at 20° C. of the impregnating liquid itself.
[3] The glass cloth used in Examples 29 to 35 had a drainage time of 2 seconds and a thickness of 0.5 mm.

The diaphragms used in Examples 28 to 30 had a drainage time and a specific conductivity index outside the favourable ranges specified hereinbefore whereas those used in Examples 31 to 35 were within the favourable ranges. The pulps treated in Examples 28 to 30 had a somewhat larger ash content, showing a significant difference in ash content.

What is claimed is:

1. A method of removing ionic substances from a pulp which comprises continuously passing a pulp slurry comprising a dispersion of a pulp in a liquid medium at a concentration of 0.05% to 6.0% by weight between oppositely charged facing electrodes, to which an electric potential is applied, said pulp slurry having an electric conductivity of at least $$10 \ \mu\mho./cm.$$

when passing said electrodes, the pulp fibers in the slurry being mingled with one another while being moved between said facing electrodes.

2. The method of claim 1, wherein said method comprises interposing ion carrier layers comprising a liquid medium having an electric conductivity of at least $$10 \ \mu\mho./cm.$$

between the passing layer of the pulp slurry and each of said electrodes.

3. The method of claim 2, wherein said method comprises isolating said ion carrier layer from the passing layer of the pulp slurry by interposing a diaphragm therebetween, said diaphragm permitting the passage of ions and obstructing the passage of pulp fibers.

4. The method of claim 1, wherein said liquid medium contains an electrolyte which dissociates into ions in said liquid medium.

5. The method of claim 1, wherein said liquid medium is water containing at least one member selected from the group consisting of water-soluble metal salts and water-soluble ammonium salts.

6. The method of claim 1, wherein said liquid medium is a mixture of water and at least one member selected from the group consisting of carboxylic acids, amino acids, phenols and water-soluble organic substances selected from the group consisting of lower aliphatic alcohols, glycols, glycerins, aldehydes, ketones, ketone alcohols, ethers, carboxylic acid esters, and acid amides.

7. The method of claim 1, wherein said liquid medium is a mixture of water, an electrolyte which dissociates into ions in water, and at least one member selected from the group consisting of carboxylic acids, amino acids, phenols, and water-soluble organic substances selected from the group consisting of lower aliphatic alcohols, glycols, glycerins, ethers, carboxylic acid esters, aldehydes, ketones, ketone alcohols, and acid amides.

8. The method of claim 1, wherein said liquid medium is a mixture of water, at least one member selected from the group consisting of water-soluble metal salts and water-soluble ammonium salts, and at least one member selected from the group consisting of carboxylic acids, amino acids, phenols, and water-soluble organic substances selected from the group consisting of lower aliphatic alcohols, glycols, glycerins, ethers, carboxylic acid esters, aldehydes, ketones, ketone alcohols, and acid amides.

9. The method of claim 5, wherein said water-soluble metal salts and said water-soluble ammonium salts are the alkali metal salts of inorganic acids, carboxylic acids and amino acids, the alkaline earth metal salts of inorganic acids, carboxylic acids and amino acids, the ammonium salts of inorganic acids, carboxylic acids, and amino acids, or the alkali metal phenolates.

10. The method of claim 8, wherein said water-soluble metal salts and said water-soluble ammonium salts are the alkali metal salts of inorganic acids, carboxylic acids and amino acids, the alkaline earth metal salts of inorganic acids, carboxylic acids and amino acids, the ammonium salts of inorganic acids, carboxylic acids, and amino acids, or the alkali metal phenolates.

11. The method of claim 4, wherein said electrolyte is at least one member selected from the group consisting of a carboxylic acids, amino acids, phenols and inorganic acids.

12. The method of claim 1, wherein said concentration ranges from 0.5% to 3.0%.

13. The method of claim 1, wherein said pulp slurry is passed between said facing electrodes for from 1 second to 10 minutes.

14. The method of claim 1, wherein said pulp slurry passing between said facing electrodes has an electric conductivity of from $$50 \ to \ 3000 \ \mu\mho./cm.$$

15. The method of claim 2, wherein said liquid medium has an electric conductivity of from $$10 \ to \ 5000 \ \mu\mho./cm.$$

16. The method of claim 3, wherein said liquid medium of said ion carrier layers has an electric conductivity of $$10 \ to \ 5000 \ \mu\mho./cm.$$

17. The method of claim 3, wherein said diaphragm has a drainage time of at least 100 seconds determined in accordance with JIS P 3801 (1956) Item 7.5, and wherein said diaphragm when impregnated with a liquid having an electric conductivity of at least $$100 \ \mu\mho./cm.$$

has an electric conductivity of at least 1/1000 of the electric conductivity of said liquid.

18. The method of claim 3, wherein said diaphragm is made of a material selected from the group consisting of a sintered glass plate, an open cellular plastic foamed sheet, a woven or nonwoven fabric composed of natural polymer fibers, synthetic polymer fibers or mixtures thereof, and a paper composed of natural polymer fibers, synthetic polymer fibers or mixtures thereof.

19. The method of claim 1, wherein a voltage of 20 v. to 500 v. per centimeter of the distance between the facing electrodes is applied.

20. The method of claim 1, wherein said liquid medium consists essentially of water.

21. The method of claim 1, wherein said pulp slurry is in direct contact with said electrodes.

22. The method of claim 2, wherein said pulp slurry is in direct contact with said ion carrier layers.

23. The method of claim 2, wherein said ion carrier layers are flowing.

24. The method of claim 2, wherein said ion carrier layers are static.

25. The method of claim 1, wherein said oppositely charged facing electrodes have applied thereto an alternating voltage whose half cycle is equal to or longer than the time taken for the ionic substances in the fiber to be extracted into the liquid medium.

26. The method of claim 1, wherein said oppositely charged facing electrodes have applied thereto a direct current voltage.

27. The method of claim 1, wherein said concentration ranges from 0.5% to 3% and said pulp slurry is passed between said facing electrodes for from 1 second to 10 minutes while applying a voltage of 20 v. to 500 v. per centimeter of the distance between the facing electrodes.

References Cited
UNITED STATES PATENTS

| | | | |
|---|---|---|---|
| 942,207 | 12/1909 | Kitsee | 204—131 |
| 1,062,016 | 5/1913 | Langlet | 204—131 |
| 1,878,235 | 9/1932 | Gortner et al. | 204—131 |
| 2,631,100 | 3/1953 | Aten et al. | 204—151 X |
| 2,636,852 | 4/1953 | Juda et al. | 204—151 |
| 2,671,055 | 3/1954 | Aten et al. | 204—131 |
| 2,694,680 | 11/1954 | Katz et al. | 204—151 X |

JOHN H. MACK, Primary Examiner

ARTHUR C. PRESCOTT, Assistant Examiner

U.S. Cl. X.R.

204—299, 301